United States Patent [19]

Ohsumi et al.

[11] 3,903,186

[45] Sept. 2, 1975

[54] PROCESS FOR DEALKYLATION OF AN ALKYLATED AROMATIC HYDROCARBON

[75] Inventors: Yoshio Ohsumi; Yasuhiro Komatsuzaki, both of Tokyo, Japan

[73] Assignees: Mitsubishi Chemical Industries Ltd.; Asia Oil Company Limited, both of Tokyo, Japan

[22] Filed: Sept. 21, 1973

[21] Appl. No.: 399,476

[30] Foreign Application Priority Data
Sept. 30, 1972  Japan................................ 47-98266

[52] U.S. Cl........................ 260/672 R; 208/48 AA
[51] Int. Cl.$^2$............................................ C07C 3/58
[58] Field of Search............. 260/672 R; 208/48 AA

[56] References Cited
UNITED STATES PATENTS

| | | | |
|---|---|---|---|
| 2,960,545 | 11/1960 | Seubold | 260/672 R |
| 3,240,697 | 3/1966 | Miale et al. | 260/672 R |
| 3,284,525 | 11/1966 | Begley | 260/672 R |
| 3,310,592 | 3/1967 | Fukuda et al. | 260/672 R |
| 3,367,884 | 2/1968 | Reid | 260/672 R |
| 3,449,078 | 6/1969 | Quik et al. | 260/672 R |
| 3,812,196 | 5/1974 | Uchiyama et al. | 260/672 R |

*Primary Examiner*—C. Davis
*Attorney, Agent, or Firm*—Bierman & Bierman

[57] ABSTRACT

There is disclosed a process for dealkylation of an alkylated aromatic hydrocarbon which comprises reacting an alkylated aromatic hydrocarbon with steam at a temperature of from 400° to 1,000°C in the presence of a catalyst containing at least one compound of metal belonging to Group 3A of the Periodic Table; in such process the reaction system contains sulfur or a sulfur compound to facilitate the reaction.

16 Claims, No Drawings

PROCESS FOR DEALKYLATION OF AN ALKYLATED AROMATIC HYDROCARBON

This invention relates to a process for dealkylation of an alkylated aromatic hydrocarbon and, in particular, to a process which comprises reacting an alkylated aromatic hydrocarbon with steam in the presence of a catalyst containing at least one metal belonging to Group 3A of the Periodic Table (hereinafter referred to as rare earth metal) to effect dealkylation of the alkylated aromatic hydrocarbon to produce corresponding aromatic hydrocarbon which is free of substituent or has fewer substituent than those originally present.

Herebefore, commercially accepted and widely practiced processes for dealkylation of an alkylated aromatic hydrocarbon all involved catalytic or heat decomposition of alkylated aromatic hydrocarbon using hydrogen at high temperature and high pressure. However, these processes have an inherent disadvantage in that expensive hydrogen is to be used. Recently, attention has been drawn to a steam dealkylation process using steam instead of hydrogen.

The steam dealkylation process is advantageous from an economic point of view, because it is unnecessary to use hydrogen but there is obtained a byproduct gas containing hydrogen. It is essential that the catalysts adapted for steam dealkylation possess the properties of high selectivity, stability in the presence of high temperature steam and that they leave no deposit of carbon; however, such as ideal catalyst has never been found.

Various catalysts applicable to steam dealkylation have been proposed, for example, Ni—BeO system (OLS 2049151), Ni—$Cr_2O_3$ system, $Al_2O_3$—$K_2O$—$Fe_2O_3$—Rh—$Cr_2O_3$ system (U.S. Pat. No. 3,649,706), $Al_2O_3$—$Li_2O$—Pt system (U.S. Pat. No. 3,649,707) and Ir—$Al_2O_3$ system. However, they have yet not been practiced, and further these catalysts involve inherent disadvantages in that the systems should be subjected to reduction pretreatment and the temperature at which the reaction is carried out is limited to a temperature range within which no oxidation of the system with steam and no decomposition of benzene ring are observed; therefore, such catalysts cannot be used at too high a temperature. Thus, in case where as raw material an alkylated aromatic hydrocarbon containing paraffinic hydrocarbon of more than six carbon atoms is employed, such paraffinic hydrocarbon is not completely decomposed to adversely affect on the purity of the dealkylated aromatic hydrocarbon product.

Accordingly, an object of this invention is to provide a process for steam dealkylation of an alkylated aromatic hydrocarbon free of the abovementioned defects.

Another object is to provide a process for steam dealkylation of an alkylated aromatic hydrocarbon using a catalyst containing rare earth metal.

Still another object is to carry out such steam dealkylation in the presence of sulfur or a sulfur compound to increase the yield of the desired product.

According to one aspect of this invention, an alkylated aromatic hydrocarbon is subjected to a reaction with steam in the presence of a catalyst containing rare earth metal to obtain a corresponding aromatic hydrocarbon which is free of substituent or has fewer substituent than those originally present. According to another aspect of this invention, sulfur or a sulfur compound such as mercaptan and hydrogen sulfide is incorporated into the reaction system thereby increasing the yield of the desired product.

The alkylated aromatic hydrocarbon which can be employed according to this invention is an aromatic hydrocarbon with one or more alkyl groups as substituent and examples of which include, for example, an alkyl benzene such as toluene, xylene, ethylbenzene and cumene, and an alkyl substituted condensed hydrocarbon such as methylnaphthalene.

The catalyst which can be employed according to this invention is one containing at least one rare earth metal, for example, yttrium, lanthanum, cerium, praseodymium, neodymium samarium an thorium, and cerium being most preferred. When about 10% by weight of uranium is incorporated in cerium, the catalytic characteristic is improved. In the catalyst, rare earth metal can be used in the form of an oxide or a compound capable of being converted into an oxide under reaction conditions such as a hydroxide and an inorganic or organic salt; however, other form may be employed.

If desired, the active ingredients of catalyst can be supported on a carrier having a large surface area, such as alumina, silica-alumina, zeolite, magnesia and activated carbon. It is also possible to improve catalytic characteristic by incorporating elements other than rare earth metals into the catalyst system; for example, by incorporating barium or calcium up to 10% by weight into cerium the catalytic life is longer than with cerium alone.

The catalyst according to this invention can be prepared through any conventional method; for example, a salt of a rare earth metal is subjected to either heat decomposition in air or oxidation with high temperature steam. The surface area of the catalyst varies depending upon the kind of salt and treating method employed, and there is a tendency in that the larger the surface area, the higher the catalytic activity.

The temperature at which the dealkylation reaction is carried out ranges from 400° to 1,000°C. The lowering of reaction temperature results in remarkable decrease of reaction rate; in contrast as the reaction temperature rises the reaction rate increases, but at too high a temperature lowering of the yield of desired product is observed due to decomposition of aromatic ring. Therefore, it is preferred to employ a reaction temperature ranging from 600° to 800°C. Normal pressure is sufficient to carry out the reaction according to this invention, however, high pressure can also be employed and as the increase of the pressure the reaction temperature can be lowered.

Where the reaction according to this invention is practiced in a continuous process, the liquid space velocity of the raw material in the reaction vessel is in general within the range of from 0.1 to 10 hour$^{-1}$ and preferably from 0.3 to 3 hour$^{-1}$.

Dealkylation according to this invention is believed to proceed in accordance with following schemes in case where toluene, m-xylene and ethylbenzene are employed:

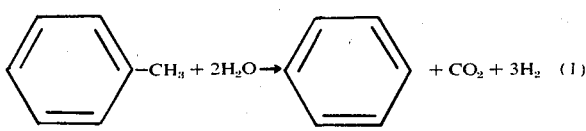

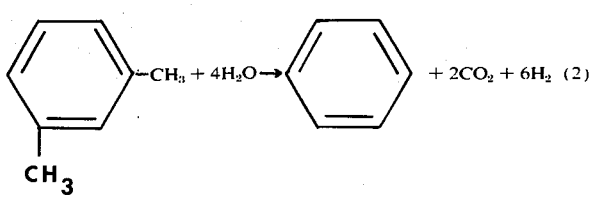

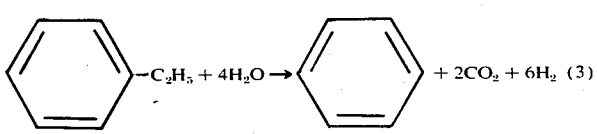

Since the gaseous mixture of reaction product contains a small amount of carbon monoxide and methane, the following side reactions also occur:

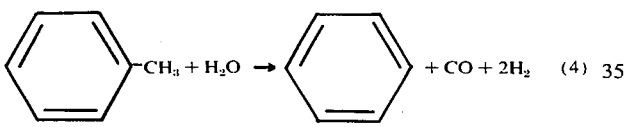

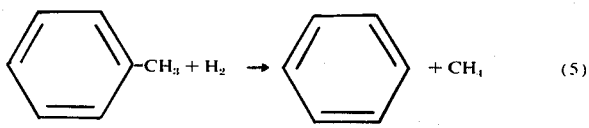

In dealkylation of an alkylated aromatic hydrocarbon by steam, it is necessary to employ, in theory, 2 molecules of water per one carbon atom in the substituent as shown in schemes (1) to (3), however, in order to change the thermodynamic equilibrium in reaction formulae (1) to (3) to the dealkylation reaction and prevent carbon deposit on the catalyst, it is preferable to use a stoichiometric excess amount of steam.

Accordingly, the amount of steam to be used varies depending upon the kind of alkylated aromatic hydrocarbons used as raw materials, and where a mixture of two or more alkylated aromatic hydrocarbons is used the total amount of steam is determined by considering the composition of the mixture and the amounts of steam required for each of the alkylated aromatic hydrocarbons. Further, where the alkylated aromatic hydrocarbon contains paraffinic hydrocarbon as an impurity, it is essential to take into consideration of the amount of steam required for decomposition of such paraffine into carbon dioxide and hydrogen according to the following reaction formula:

$$CnH_{2n+2} + 2nH_2O \rightarrow nCO_2 + (3_{n+1})H_2$$

(b)

However, unless feeding of the alkylated aromatic hydrocarbon into the reactor is reduced, too much steam results in shortening the dewell time thereby decreasing the yield, accordingly, in general, the amount of steam is one to 20 times for the stochiometric and preferably two to 10 times.

In carrying out dealkylation according to this invention the addition of sulfur or a sulfur compound to the reaction system increases the yield of the desired product.

Examples of the sulfur compound which can be added include, for example, a mercaptan such as ethylmercaptan, a disulfide such as dimethyl disulfide, a sulfur-containing organic compound such as thiophene and carbon disulfide and a sulfur-containing inorganic compound such as sulfuric acid, hydrogen sulfide and sulfur dioxide. In commercial practice, it is preferable to use mercaptan and hydrogen sulfide, especially, because hydrogen sulfide is produced in the reaction, it is recommended to recycle to the reaction system hydrogen sulfide present in the gaseous product.

The amount of sulfur compound to be added is more than 0.05% by weight as sulfur for the alkylated aromatic hydrocarbon and preferably 0.05 to 5%. The use of less sulfur compound results in no or little improvement of initial activity of the catalyst but prevents deactivation during the operation. The larger the amount of the sulfur compound used, the higher the dealkylation activity observed, so it is preferable to increase the amount of the sulfur compound to improve the reaction activity but this results in a high concentration of hydrogen sulfide in the gaseous product, in other words, a low concentration of hydrogen adversely affects the efficiency of hydrogen recovery. Thus, too much sulfur compound is disadvantageous.

It is a common practice to add the sulfur compound to either the alkylated aromatic hydrocarbon or water.

The sulfur compound added is almost completely heat decomposed in the reaction system to produce hydrogen sulfide which is recovered together with hydrogen and carbon dioxide from the system upon condensating the effluent to separate aromatic hydrocarbon. However, a small amount of hydrogen sulfide dissolved in the hydrocarbon condensate is readily removed by sequential washing of the condensate with an aqueous sodium hydroxide and water.

This invention will be explained by the following Example, but it should be understood that this invention is not limited by these Examples.

PREPARATION OF CATALYSTS

A. Various cerium compounds were calcined in air, pelletised and milled to a size ranging from 8 to 10 mesh (Japanese Industrial Standard) to prepare catalysts used in Examples 1 to 9 and 12 to 27.

The compounds and calcining temperature and times are given in Table 1.

Table 1

| Example | Cerium Compound | Temp. (°C) | Time (hr) | Catalytic component |
|---|---|---|---|---|
| 1 – 3 | Cerium oxalate | 650 | 2 | Cerium oxide |
| 4 – 5 | Cerium acetate | " | " | " |
| 6 – 8 | Cerium hydroxide | " | " | " |
| 9 | Cerium carbonate | " | " | " |
| 12 – 27 | Cerium hydroxide | 700 | " | " |

B. An aqueous solution of chlorides of rare earth metals which has been prepared from monazite was adjusted to bring a pH of below 1 by addition of hydrochloric acid and then oxalic acid was added thereto to precipitate oxalates which were filtered out, dried at 120°C for 5 hours and calcined at 560° – 600°C for 2 hours in an electric oven.

The product was employed in Examples 10 and 11.

C. The aqueous solution of the chlorides prepared as in the above (B) was adjusted by adding aqueous ammonia to bring a pH of above 12 to precipitate hydroxides which were filtered out, washed with water, dried and calcined at 700°C for 2 hours. The product was employed in Examples 28 and 29.

The components of such mixtures of oxides of rare earth metals thus obtained both (B) and (C) were (% by weight), respectively:

$C_rO_2$ 46.7   $L_{a2}O_3$ 21.2   $N_{d2}O_3$ 17.9
$Y_2O_3$ 5.0   $P_{r2}O_3$ 4.8   $S_{m2}O_3$ 2.9 and others 1.5.

The mixture of such oxides was pelletized and milled to a size ranging from 8 to 10 mesh and used as catalyst.

GENERAL PROCEDURES OF DEALKYLATION

Into a fixed bed, flow reactor filled with 6 ml of catalyst prepared as above was passed through a mixture of toluene and water (Examples 1 to 11) and a mixture of m-xylene, water and sulfur compound which was preheated at a temperature of 640° – 650°C in a preheater (Examples 12 to 29), to carry out dealkylation. The reaction product recovered from the reaction vessel was cooled to obtain condensate which separated into oil and water phases on standing. Benzene, toluene and m-xylene in the oil phase were analysed by gas chromatography.

The reaction conditions and results are given in Table 2.

Table 2

| Ex. No. | Raw material | Sulfur Compound | | The amount of water to be added[2] | The liquid space velocity of the alkylated hydrocarbon ($hr^{-1}$) | Temp. (°C) | The composition of the product (mole %) | | | The produced gas | |
|---|---|---|---|---|---|---|---|---|---|---|---|
| | | Compound | Amount to be added (wt%)[1] | | | | Benzene | Toluene | m-xylene | Volume × 10 ($NM^3$/hr)[4] | Compositions[4] |
| 1 | Toluene | | | 1.0 | 1.0 | 650 | 30.2 | 69.8 | | 1.49 | |
| 2 | " | | | 1.0 | 1.0 | 700 | 37.5 | 62.5 | | 2.48 | |
| 3 | " | | | 1.0 | 0.5 | 700 | 66.8 | 33.2 | | 3.80 | |
| 4 | " | | | 1.0 | 1.0 | 650 | 43.8 | 56.2 | | 2.50 | $CH_4$ 0.5–1.0% |
| 5 | " | | | 1.0 | 1.0 | 700 | 51.4 | 48.6 | | 3.46 | CO 3 – 8% |
| 6 | " | | | 1.0 | 1.0 | 650 | 52.1 | 47.9 | | 3.24 | $CO_2$ 15 – 20% |
| 7 | " | | | 1.0 | 0.5 | 650 | 72.3 | 27.7 | | 4.53 | $H_2$ 70 – 80% |
| 8 | " | | | 1.0 | 1.0 | 700 | 64.1 | 35.9 | | 4.61 | |
| 9 | " | | | 1.0 | 1.0 | 650 | 43.8 | 56.2 | | 3.08 | |
| 10 | " | | | 1.0 | 1.0 | 550 | 3.3 | 96.7 | | | |
| 11 | " | | | 1.0 | 1.0 | 740 | 39.7 | 60.3 | | | |
| 12 | m-xylene | — | 0 | 2.0 | 0.5 | 680 | 37.1 | 32.3 | 30.6 | 2.7 | |
| 13 | " | Ethylmercaptan | 0.13 | 2.0 | 0.5 | 680 | 58.9 | 21.8 | 19.2 | 3.4 | |
| 14 | " | " | 1.42 | 2.0 | 0.5 | 680 | 78.3 | 7.3 | 14.4 | 4.5 | $CH_4$ 0~0.5% |
| 15 | " | " | 1.42 | 2.0 | 0.5 | 650 | 60.9 | 13.4 | 25.7 | 3.4 | CO 3~8% |
| 16 | " | " | 1.42 | 2.0 | 0.5 | 620 | 49.6 | 13.4 | 37.0 | 3.2 | $CO_2$ 18~25% |
| 17 | " | " | 1.42 | 2.0 | 0.5 | 600 | 42.5 | 12.7 | 44.8 | 2.8 | $H_2$ 70~80% |
| 18 | " | Thiophene | 0.47 | 2.0 | 0.5 | 680 | 48.1 | 16.0 | 35.9 | 3.1 | $H_2S$ 0~1% |
| 19 | " | " | 1.40 | 2.0 | 0.5 | 680 | 58.5 | 11.5 | 30.0 | 3.5 | |
| 20 | " | " | 2.16 | 2.0 | 0.5 | 680 | 75.7 | 14.1 | 10.2 | 4.4 | |
| 21 | " | " | 2.77 | 2.0 | 0.5 | 680 | 89.2 | 6.6 | 4.2 | 5.2 | |
| 22 | " | DMDS[3] | 1.47 | 2.0 | 0.5 | 680 | 60.2 | 9.9 | 29.9 | 3.6 | |
| 23 | " | $CS_2$ | 1.35 | 2.0 | 0.5 | 680 | 57.9 | 11.8 | 30.3 | 3.6 | |
| 24 | " | " | 1.67 | 2.0 | 0.5 | 680 | 87.0 | 6.2 | 6.8 | 5.3 | |
| 25 | " | " | 2.46 | 2.0 | 0.5 | 680 | 88.6 | 5.4 | 6.0 | 5.3 | |
| 26 | " | $H_2SO_4$ | 2.58 | 2.0 | 0.5 | 680 | 74.6 | 13.4 | 12.0 | 4.0 | |
| 27 | " | $H_2S$ | 3.31 | 2.0 | 0.5 | 680 | 58.8 | 21.3 | 19.9 | 3.9 | |
| 28 | " | — | 0 | 2.0 | 0.5 | 680 | 14.7 | 26.4 | 58.9 | 1.5 | |
| 29 | " | $CS_2$ | 2.46 | 2.0 | 0.5 | 680 | 24.6 | 27.2 | 43.2 | 2.8 | |

[1]The amount in term of S for m-xylene
[2]The amount at normal temperature and normal pressure
[3]Dimethyldisulfide
[4]These results were obtained after continuation of the reaction for 5 hours (in Examples 1 to 10) and 10 hours (in Examples 12 to 29).

We claim:

1. A process for dealkylation of an alkylated aromatic hydrocarbon which comprises reacting an alkylated aromatic hydrocarbon with steam at a temperature of from 600° to 800° in the presence of a catalyst consisting essentially of at least one compound of a metal selected from the group of elements consisting of yttrium, lanthanum, cerium, praseodyminum, neodymium, samarium and thorium.

2. The process for dealkylation of an alkylated aromatic hydrocarbon according to claim 1, wherein said catalyst is an oxide of said metal.

3. The process for dealkylation of an alkylated aromatic hydrocarbon according to claim 2, wherein said catalyst is cerium oxide.

4. The process for dealkylation of an alkylated aromatic hydrocarbon according to claim 2, wherein said alkylated aromatic hydrocarbon is fed to a reaction vessel at a liquid space velocity of from 0.1 to 10 hour$^{-1}$.

5. The process for dealkylation of an aromatic hydrocarbon according to claim 2, wherein the amount of said steam is from one to 20 times the stoichiometric amount, said stoichiometric amount being two molecules of water per carbon atom in the alkyl substituent.

6. The process for dealkylation of an alkylated aromatic hydrocarbon according to claim 5 wherein the amount of said water is from two to 10 times the stoichiometric amount.

7. The process for dealkylation of an alkylated aromatic hydrocarbon according to claim 2, wherein said alkylated aromatic hydrocarbon is a compound selected from the group consisting of toluene and xylene.

8. The process for dealkylation of an alkylated aromatic hydrocarbon according to claim 2, wherein sulfur or a sulfur compound is present in the reaction system.

9. The process for dealkylation of an alkylated aromatic hydrocarbon according to claim 8, wherein the amount of said sulfur compound is from 0.05 to 5% by weight as sulfur for said alkylated aromatic hydrocarbon.

10. The process for dealkylation of an alkylated aromatic hydrocarbon according to claim 8, wherein said sulfur compound is a mercaptan.

11. The process for dealkylation of an alkylated aromatic hydrocarbon according to claim 8, wherein said sulfur compound is hydrogen sulfide.

12. A process for dealkylation of an alkylated aromatic hydrocarbon which comprises passing a gas mixture comprising an alkylated aromatic hydrocarbon and steam mixed in a ratio of 2 to 20 molecules of steam per carbon atom in the alkyl substituent through a catalyst bed comprising cerium oxide, at a temperature of from 600° to 800°C and at a liquid space velocity of said hydrocarbon between 0.1 and 10 hour$^{-1}$.

13. The process for dealkylation of an alkylated aromatic hydrocarbon according to claim 12, wherein said gas mixture contains a sulfur compound in an amount of 0.05 to 5% by weight as sulfur.

14. The process for dealkylation of an alkylated aromatic hydrocarbon according to claim 13, wherein said sulfur compound is a mercaptan.

15. The process for dealkylation of an alkylated aromatic hydrocarbon according to claim 13, wherein said sulfur compound is hydrogen sulfide.

16. The process for dealkylation of an alkylated aromatic hydrocarbon according to claim 12, wherein said alkylated aromatic hydrocarbon is a compound selected from the group consisting of toluene and xylene.

* * * * *